Figure 1:
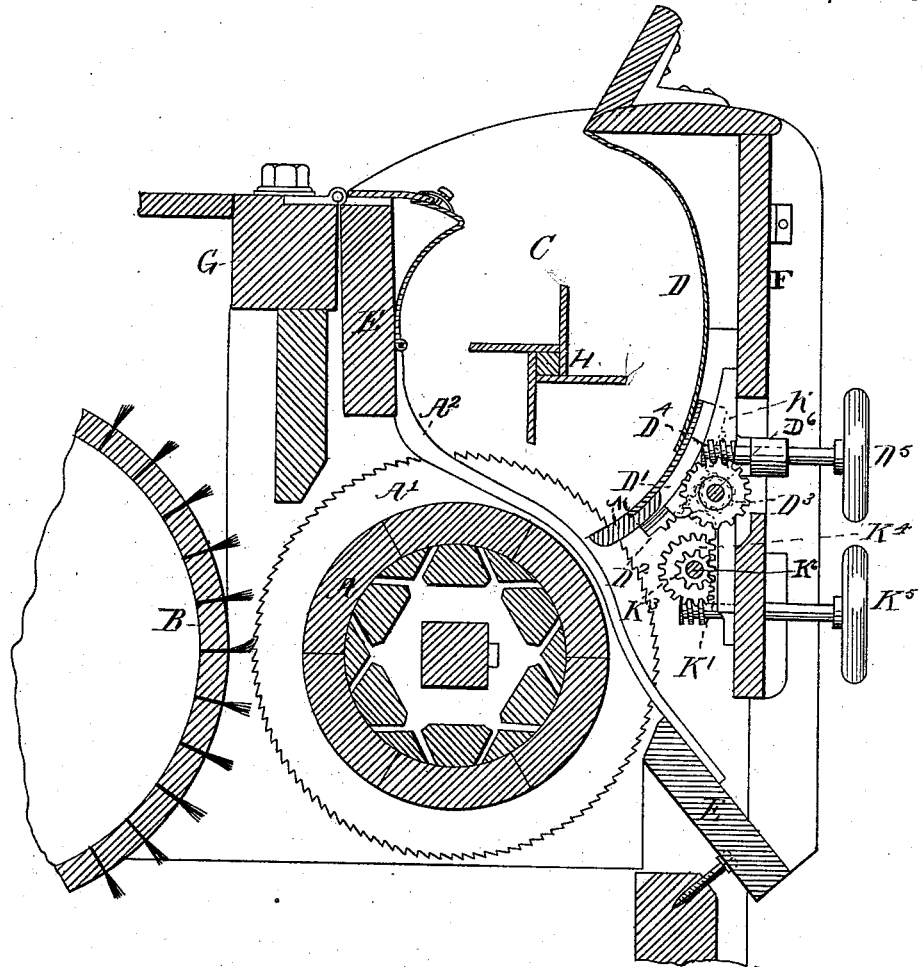

(No Model.)

F. S. STRONG & F. C. MANN.
COTTON SEED LINTER.

No. 290,279. Patented Dec. 18, 1883.

WITNESSES
Chas. Spaulding
Wm. H. Davidson

INVENTORS
Frederick S. Strong
Frederick C. Mann
Per Frank G. Parker Atty (No Model.)  2 Sheets—Sheet 2.
F. S. STRONG & F. C. MANN.
COTTON SEED LINTER.
No. 290,279.  Patented Dec. 18, 1883.
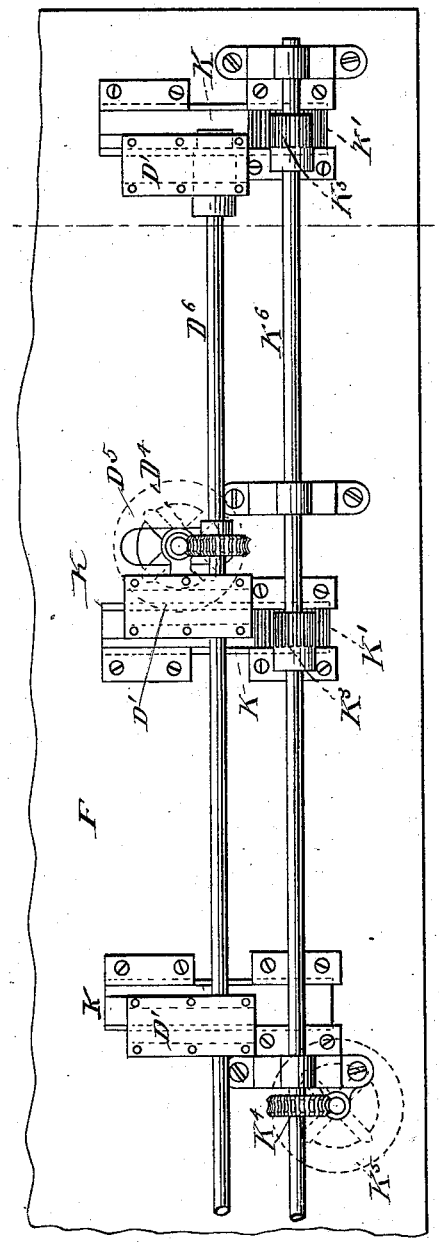
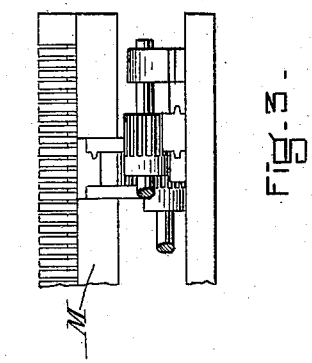
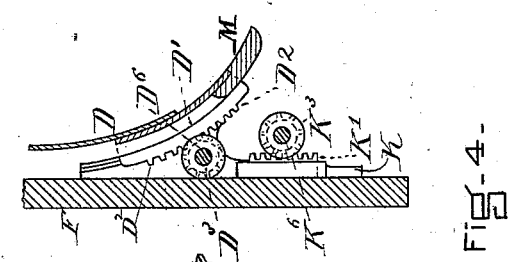
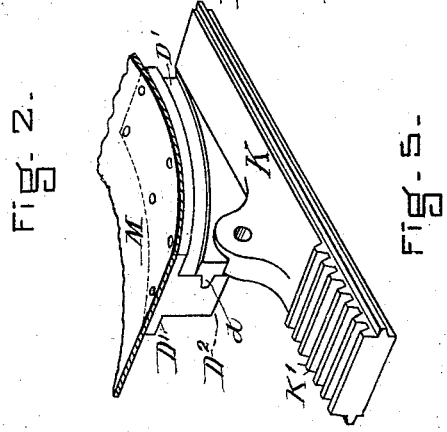
WITNESSES
Chas. Spaulding
W<sup>m</sup> H. Davidson
INVENTORS
Frederick S. Strong
Frederick C. Mann
Per. Frank G. Parker Atty.

UNITED STATES PATENT OFFICE.

FREDERICK S. STRONG AND FREDERICK C. MANN, OF EAST BRIDGEWATER, MASSACHUSETTS.

COTTON-SEED LINTER.

SPECIFICATION forming part of Letters Patent No. 290,279, dated December 18, 1883.

Application filed August 27, 1883. (No model.)

*To all whom it may concern:*

Be it known that we, FREDERICK S. STRONG and FREDERICK C. MANN, citizens of the United States, residing at East Bridgewater, in the county of Plymouth and State of Massachusetts, have invented certain new and useful Improvements in Cotton-Seed Linters, of which the following is a specification.

Our invention relates to a device for adjusting the lower part of the curved front casing of the hopper which holds the cotton-seed while the same is being acted upon by the saws. The object is to so arrange the lower front part of the hopper that it may be adjusted in relation to the grate-bars and saws so as to more properly present the seeds to the action of the machine. We attain this object by the mechanism illustrated in the accompanying drawings, in which—

Figure 1 is a cross vertical section, showing the working parts of a linter with our improvements attached. Fig. 2 is a view looking from the interior toward the front of the hopper, the lower front part of said hopper being removed, so as to show the devices which we use for adjusting said lower front part of the hopper, these devices being attached to the inner side of the front part of the linter, the whole length not being shown, as the parts omitted are simply duplicates of the parts shown at the extreme right of the drawings. Figs. 3, 4, and 5 illustrate details.

In Fig. 1, B represents the brush; A, the saw-cylinder; A', the saws; A², the grate; E E, the grate-fall frame; G, the grate-fall piece, or piece to which the grate-fall is hung; F, the front part of the linter. H represents a fluted or winged roller, which acts upon the mass of seed to cause it to revolve, so as to bring each seed and to subject all parts of the same to the action of the saws. As all of the above-enumerated parts are old and well known in the art, it is not necessary to further describe them.

We have found in practice that the exact shape and position of the lower part, M, of the front casing, D M, of the hopper C is a very important element of a linter. Therefore we have made the following-described device, in which D, Fig. 1, is formed of sheet metal, which is flexible, and is so attached to the frame-work that its lower end shall always press with a spring-pressure against the curved surface of the adjustable plate M, (see Figs. 1 and 4,) which is slotted at its lower edge, (see Fig. 3,) to receive the saws, so that it may extend near the grate, as shown in Fig. 1, and it is attached to a number of rectangular curved plates, D'. The construction of one of these rectangular plates and all of its connecting parts is shown in Figs. 4 and 5, in which D' is a curved piece of metal, provided with a curved groove which fits upon a curved way, $d$, Fig. 5, formed in the rectilinear sliding piece K. The piece D' has upon its back a segmental rack, D², which meshes into an operating-pinion, D³, Figs. 1 and 4, said operating-pinion being actuated through a worm-gear, D⁴, and a hand-wheel, D⁵, Figs. 1 and 2. The curved piece D' and its actuating-rack is mounted upon a vertically-sliding piece, K, said sliding piece K being provided with a rack, K', Figs. 1, 2, 4, and 5, and operated by a pinion, K³, said pinion K³ being actuated by a worm-gear, K⁴, and hand-wheel K⁵.

From the above it may be seen that the curved piece M may be operated in two directions—viz., in the arc of a circle by turning the hand-wheel D⁵, and vertically by turning the hand-wheel K⁵. (See Fig. 1.) This compound movement of the curved plate M allows the operator to adjust it with great precision, both in relation to the grate-bars A² and the fluted roller H, so that the seed may be presented in the best possible manner to the saws A'. This double adjustment enables the operator to so shape the lower part of the hopper as to adapt the machine to its best working conditions for any given speed, or for any given characteristic of the cotton-seed to be operated upon. This adjustment is soon acquired in practice by the operator.

For convenience in adjusting the whole length of the plate M, we have connected the actuating devices, of which we prefer to use four, (although they need not all be provided with the rack and pinion K' K³,) by the longitudinal shafts $D^6$ $K^6$. (See Figs. 1, 2, 3, and 4.) The shaft $K^6$ has upon it all of the pinions $K^3$, which are used to operate the racks $K'$, while the shaft $D^6$ has upon it all of the pinions $D^3$, which operate the segmental racks $D^2$. The shaft $K^6$ is operated by a single hand-wheel, $K^5$, and the shaft $D^6$ by the hand-wheel $D^5$.

We claim as our invention—

In a cotton-seed linter, the combination of the curved plates D M, forming the front casing of the hopper, mechanism for moving the plate M in a curved line, sliding pieces K, and mechanism for moving them vertically, substantially as described, and for the purpose set forth.

FREDERICK S. STRONG.
FREDERICK C. MANN.

Witnesses:
CHAS. SPAULDING,
FRANK G. PARKER.